United States Patent
Sato et al.

(10) Patent No.: US 8,771,882 B2
(45) Date of Patent: Jul. 8, 2014

(54) METHOD FOR PRODUCING ELECTROLYTE SOLUTION FOR LITHIUM ION BATTERY AND LITHIUM ION BATTERY USING SAME

(75) Inventors: Keiji Sato, Ube (JP); Meguru Oe, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 1353 days.

(21) Appl. No.: 12/096,147

(22) PCT Filed: Nov. 7, 2006

(86) PCT No.: PCT/JP2006/322140
§ 371 (c)(1),
(2), (4) Date: Jun. 4, 2008

(87) PCT Pub. No.: WO2007/066464
PCT Pub. Date: Jun. 14, 2007

(65) Prior Publication Data
US 2009/0311610 A1     Dec. 17, 2009

(30) Foreign Application Priority Data

Dec. 6, 2005   (JP) ................................ 2005-351406

(51) Int. Cl.
*H01M 6/18*   (2006.01)

(52) U.S. Cl.
USPC ........... 429/323; 429/338; 429/342; 429/341; 429/200; 252/62.2; 423/300; 423/301; 423/462; 423/483

(58) Field of Classification Search
USPC ......... 429/323, 338, 342, 341, 200; 252/62.2; 423/300, 301, 462, 483
See application file for complete search history.

(56) References Cited

U.S. PATENT DOCUMENTS

| | | | |
|---|---|---|---|
| 5,866,093 | A | 2/1999 | Belt et al. |
| 6,197,205 | B1 | 3/2001 | Tsujioka et al. |

FOREIGN PATENT DOCUMENTS

| | | | |
|---|---|---|---|
| EP | 0 816 288 A1 | | 1/1998 |
| JP | 64-72901 A | | 3/1989 |
| JP | 6-56413 A | | 3/1994 |
| JP | 9-165210 | * | 6/1997 |
| JP | 9-165210 A | | 6/1997 |
| JP | 10-72207 A | | 3/1998 |
| JP | 10-81505 | * | 3/1998 |
| JP | 10-81505 A | | 3/1998 |
| JP | 10-92468 A | | 4/1998 |
| JP | 11-154519 A | | 6/1999 |
| JP | 11-171518 A | | 6/1999 |
| WO | WO 98/06666 A1 | | 2/1998 |

OTHER PUBLICATIONS

Supplementary European Search Report dated Nov. 26, 2008 (Five (5) pages).
International Search Report dated Jan. 23, 2007 including English translation (two (2) pages).

* cited by examiner

*Primary Examiner* — Laura Weiner
(74) *Attorney, Agent, or Firm* — Crowell & Moring LLP

(57) ABSTRACT

There is provided a method for producing an electrolyte solution for lithium ion batteries, in which lithium hexafluorophosphate is used as an electrolyte, comprising the steps of (a) reacting phosphorus trichloride, chlorine and lithium chloride in a nonaqueous organic solvent; and (b) reacting a reaction product of the step (a) formed in the solvent, with hydrogen fluoride.

8 Claims, No Drawings

METHOD FOR PRODUCING ELECTROLYTE SOLUTION FOR LITHIUM ION BATTERY AND LITHIUM ION BATTERY USING SAME

TECHNICAL FIELD

The present invention relates to a method for producing an electrolyte solution for lithium ion batteries, which uses lithium hexafluorophosphate as the electrolyte, and to a lithium ion battery using same.

BACKGROUND OF THE INVENTION

Various methods for producing lithium hexafluorophosphate, which is an electrolyte useful for lithium ion batteries and the like, have been proposed. As a normal electrolyte solution production, a method is conducted in which firstly lithium hexafluorophosphate is produced, and it is dissolved in a predetermined lithium battery solvent to make an electrolyte solution. Regarding the method for producing lithium hexafluorophosphate, for example, there is a method (Patent Publication 1) in which lithium fluoride in solid and phosphorus pentafluoride in gas are reacted with no solvent. In this method, there is a danger that a film of the reaction product is formed on the surface of lithium fluoride, thereby the reaction does not proceed completely, and the unreacted lithium fluoride remains. There is also a method (Patent Publication 2) in which a reaction is conducted by adding anhydrous hydrogen fluoride to phosphorus pentachloride and lithium fluoride with no solvent as above. The reaction control is difficult in this, and cooling down to several ten degrees below freezing point is necessary.

On the other hand, in the methods for producing lithium hexafluorophosphate using solvent, there is a method (Patent Publication 5) in which gaseous phosphorus pentafluoride is reacted with lithium fluoride dissolved by using anhydrous hydrogen fluoride as solvent, and the resulting lithium hexafluorophosphate is crystallized and taken out.

In this method, conversion of lithium hexafluorophosphate is high, but it is necessary to use a large amount of anhydrous hydrogen fluoride, which is high in vapor pressure and has toxicity and corrosiveness, as solvent. Therefore, handling is not easy. Furthermore, there are many factors related to high cost, such as necessity of producing phosphorus pentafluoride, which is one of the raw materials, by another process, and necessity of providing a process for crystallizing lithium hexafluorophosphate.

There is a method (Patent Publication 3) in which lithium fluoride and phosphorus pentafluoride are reacted in organic solvent. This method has a great advantage in terms of reaction control and purity, but as mentioned above it is necessary to produce and handle phosphorus pentafluoride gas, which is one of the raw materials, by another process. Therefore, a problem of cost remains.

Furthermore, there is also a method (Patent Publication 4) in which phosphorus trichloride, chlorine and hydrogen fluoride are reacted by using anhydrous hydrogen fluoride or $CH_3CN$, which is a polar organic solvent, as the solvent to obtain phosphorus pentafluoride, followed by adding lithium fluoride to the same reactor to react it with phosphorus pentafluoride, thereby producing lithium hexafluorophosphate.

This method is efficient since the production of phosphorus pentafluoride is also conducted in the same reactor. However, it goes through the production of phosphorus pentafluoride, which is high in vapor pressure. Therefore, it is necessary to have expensive facilities such as pressurized reactor and complicated operations. Basically, the crystallization process is necessary. Therefore, many problems remain such as difficulty of drastic cost reduction in the electrolyte solution production.

Patent Publication 1: Japanese Patent Publication 64-72901
Patent Publication 2: Japanese Patent Application Publication 10-72207
Patent Publication 3: Japanese Patent Application Publication 9-165210
Patent Publication 4: Japanese Patent Application Publication 10-81505
Patent Publication 5: Japanese Patent Application Publication 6-56413

SUMMARY OF THE INVENTION

The task in the present invention resides in producing an electrolyte solution, in which lithium hexafluorophosphate is used as an electrolyte, with low price and in using it for lithium ion batteries, without using anhydrous hydrogen fluoride solvent, which is not easy in handling, without necessity of expensive facilities and complicated operations, and without conducting the crystallization process, as mentioned above, in producing an electrolyte solution for lithium ion batteries in which lithium hexafluorophosphate is used as the electrolyte.

In view of such task, as a result of an eager research, the present inventors have found a method capable of obtaining an electrolyte solution using lithium hexafluorophosphate as an electrolyte with low price, without using anhydrous hydrogen fluoride solvent, which is not easy in handling, without necessity of expensive facilities and complicated operations, and without conducting the crystallization process, as mentioned above, in producing an electrolyte solution for lithium ion batteries in which lithium hexafluorophosphate is used as the electrolyte, thereby reaching the present invention.

According to the present invention, there is provided a method for producing an electrolyte solution for lithium ion batteries, in which lithium hexafluorophosphate is used as an electrolyte, comprising the steps of (a) reacting phosphorus trichloride, chlorine and lithium chloride in a nonaqueous organic solvent; and (b) reacting a reaction product of the step (a) formed in the solvent, with hydrogen fluoride. Furthermore, this production method may comprise the step (c) of adding lithium chloride to a reaction product of the step (b).

DETAILED DESCRIPTION

According to the present invention, it is possible to obtain a high-purity, electrolyte solution for lithium ion batteries with low price, without using anhydrous hydrogen fluoride solvent, which is difficult in handling, without necessity of expensive facilities and complicated operations, and without conducting the crystallization process, in producing an electrolyte solution for lithium ion batteries in which lithium hexafluorophosphate is used as the electrolyte. Furthermore, it is possible to provide a lithium ion battery using the electrolyte solution.

In the method for producing an electrolyte solution for lithium ion batteries containing lithium hexafluorophosphate of the present invention, reaction yield is high and it is basically possible to conduct the reaction at atmospheric pressure. Therefore, the reaction control is easy. Furthermore, there is an advantage that the reaction solution can directly be used as an electrolyte solution for lithium ion batteries by using a nonaqueous organic solvent for lithium ion batteries as the reaction solvent, without taking out lithium hexafluorophosphate powder through crystallization.

The method for producing an electrolyte solution for lithium ion batteries of the present invention is conducted in one kind or several kinds of the above nonaqueous organic solvent for lithium batteries.

As the nonaqueous organic solvent used, a chain or cyclic carbonate compound or an ether compound having at least two oxygen atoms, which is high in chemical stability and in which lithium hexafluorophosphate is high in solubility, is preferable. As such solvent, it is possible to cite dimethyl carbonate, diethyl carbonate, methyl ethyl carbonate, ethylene carbonate, propylene carbonate, 1,2-dimethoxyethane, and the like.

In the production method of the present invention, firstly phosphorus trichloride and lithium chloride, which are the raw materials, are added to a nonaqueous organic solvent, and chlorine gas is blown into this to conduct the reaction in the nonaqueous organic solvent, and then hydrogen fluoride is introduced into the solvent containing the reaction product, thereby reacting it with the reaction product.

In the present invention, the molar ratios of lithium chloride, chlorine and phosphorus trichloride are respectively 1-1.1:1:1-2. It is necessary to add phosphorus trichloride in an amount that is the same as chlorine gas or more than chlorine gas. This is because excessive chlorine gas reacts with the solvent to produce impurities if the amount of chlorine gas is greater than phosphorus trichloride. Therefore, it is necessary to add phosphorus trichloride in an amount that is 1 to 2 times that of chlorine gas. In terms of the raw material cost, the amount of lithium chloride is preferably 1 to 1.1 times, more preferably 1.05 to 1.1 times, that of chlorine gas.

Next, with respect to the amount of the raw material added to the nonaqueous organic solvent, it is necessary to have lithium chloride in 400 g or less, preferably 100 g or less, relative to 1 liter of the nonaqueous organic solvent. If the amount of lithium chloride is greater than 400 g relative to 1 liter of the nonaqueous organic solvent, the product becomes a saturation, and the unreacted lithium chloride is generated, thereby not allowing the reaction to proceed.

Regarding the temperature upon conducting this reaction, the lower limit is −40° C., preferably 5° C., and the upper limit is 100° C., preferably 50° C. If the reaction temperature is lower than −40° C., the nonaqueous organic solvent solidifies, thereby not allowing the reaction to proceed. In the case of being higher than 100° C., it causes coloring and side reactions. Therefore, it is not preferable.

The pressure upon the reaction is not particularly limited. There is no gas component to be formed, and the reaction proceeds quickly 100% at atmospheric pressure. Therefore, it is not necessary to use a special pressure-proof reactor, and basically it is conducted at around atmospheric pressure.

If it is irradiated with light upon the reaction, there is a danger that a reaction between the nonaqueous organic solvent and chlorine occurs. Therefore, it is preferable to conduct it under a shaded condition upon the reaction.

On the other hand, after completing the chlorine gas blowing, the lithium chloride powder added to the reactor is totally or partly dissolved by the reaction formula (1) and turns into an intermediate compound that is assumed to be lithium hexachlorophosphate.

$$LiCl+PCl_3+Cl_2 \rightarrow LiPCl_6 \quad (1)$$

Next, anhydrous hydrogen fluoride is introduced into the reactor in order to fluorinate lithium hexachlorophosphate formed. Upon this, the anhydrous hydrogen fluoride may take a gaseous or liquid form. The target product, lithium hexafluorophosphate, is obtained by the following reaction formula (2).

$$LiPCl_6+6HF \rightarrow LiPF_6+6HCl \quad (2)$$

It is necessary that the amount of the anhydrous hydrogen fluoride to be introduced is more than 6.01 times by mol the total amount of lithium hexachlorophosphate, which is the intermediate, and an excess of phosphorus trichloride in the previous reaction. If the amount of anhydrous hydrogen fluoride is the same as or less than the total amount of lithium hexachlorophosphate and an excess of phosphorus trichloride, fluorination of lithium hexachlorophosphate does not proceed sufficiently, and partially fluorochlorinated lithium phosphate and phosphorus trichloride remain. Therefore, the chlorine concentration in the solution becomes high, and there is a danger to cause adverse effects on the lithium battery characteristics. If the amount of anhydrous hydrogen fluoride is more than 6.01 times by mol the total amount of lithium hexachlorophosphate and an excess of phosphorus trichloride, not only lithium hexachlorophosphate reacts completely into lithium hexafluorophosphate, but also an excess of phosphorus trichloride reacts into phosphorus trifluoride, which is high in vapor pressure. It becomes possible to easily remove it by a subsequent vacuum treatment or the like. Therefore, it is necessary to introduce anhydrous hydrogen fluoride in an amount that is more than the total amount of lithium hexachlorophosphate and an excess of phosphorus trichloride. From the point of raw material cost, the amount of anhydrous hydrogen fluoride to be introduced is preferably 6.01 to 7.20 times by mol the total amount of lithium hexachlorophosphate and an excess of phosphorus trichloride.

Regarding the temperature upon conducting this reaction, the lower limit is −40° C., preferably 5° C., and the upper limit is 100° C., preferably 50° C. If the reaction temperature is lower than −40° C., the nonaqueous organic solvent solidifies, thereby not allowing the reaction to proceed. In the case of being higher than 100° C., it causes coloring and side reactions. Therefore, it is not preferable.

The pressure upon this reaction is not particularly limited. It is, however, conducted normally at around atmospheric pressure to remove hydrogen chloride produced as a by-product.

In the obtained lithium hexafluorophosphate nonaqueous organic solution, it is possible to remove hydrogen chloride, phosphorus trifluoride, hydrogen fluoride, which has been introduced in excess, which are present in the solution and have been formed as by-products, by vacuum treatment, bubbling treatment, distillation or the like. Regarding only hydrogen fluoride, it can be removed, for example, by converting it to hydrogen chloride, which is high in vapor pressure, by the reaction formula (3) by adding lithium chloride again, followed by vacuum treatment, bubbling treatment, distillation or the like. It is possible to obtain a high-purity, electrolyte solution, which is usable for lithium ion batteries and in which lithium hexafluorophosphate is dissolved.

$$HF+LiCl \rightarrow LiF+HCl \quad (3)$$

It is possible to obtain lithium hexafluorophosphate crystals from the lithium hexafluorophosphate solution obtained as above through a crystallization process such as cooling or concentration. In the present invention, however, a solvent for lithium ion batteries is used as the nonaqueous organic solvent used in the reaction. Therefore, it can be used directly as an electrolyte solution raw material for lithium ion batteries without taking lithium hexafluorophosphate as a solid out of the solution obtained by the reaction through the crystallization process.

EXAMPLES

In the following, the present invention is explained further based on examples, but it is not limited by the examples.

Example 1

A polytetrafluoroethylene reactor was charged with 500 g of dimethyl carbonate, 72 g of phosphorus trichloride, and 21 g of lithium chloride, followed by stirring and dispersion. Upon this, one subjected to shading treatment was used as the polytetrafluoroethylene reactor. While maintaining this disperse solution at 10° C., 35.5 g of chlorine gas was introduced. In the solution after the introduction, solid matter was dissolved, and it turned into a pale-yellow solution, and lithium hexachlorophosphate was formed by the progress of the reaction. To the obtained solution, 66 g of anhydrous hydrogen fluoride was introduced, while maintaining it at 10° C. The solution after the introduction changed from pale-yellow to colorless, and lithium hexafluorophosphate was formed.

Then, the excessive hydrogen fluoride in the obtained solution was converted to hydrogen chloride and lithium fluoride by adding lithium chloride again, and they were removed by vacuum treatment together with hydrogen chloride and phosphorus trifluoride, which were by-products during the reaction.

By NMR analysis of the obtained solution, dimethyl carbonate decomposition or the like was not found, and the product was only lithium hexafluorophosphate. The amount of lithium hexafluorophosphate in the solution determined by NMR was 75 g, and yield was confirmed to be almost 100%. Furthermore, regarding this solution, the concentration of acid impurities having adverse effects on lithium battery characteristics was 10 ppm, and it was 70 ppm based on lithium hexafluorophosphate solid matter.

Example 2

A polytetrafluoroethylene reactor was charged with 500 g of diethyl carbonate, 72 g of phosphorus trichloride, and 21 g of lithium chloride, followed by stirring and dispersion. Upon this, one subjected to shading treatment was used as the polytetrafluoroethylene reactor. While maintaining this disperse solution at 10° C., 35.5 g of chlorine gas was introduced. In the solution after the introduction, solid matter was dissolved, and it turned into a pale-yellow solution, and lithium hexachlorophosphate was formed by the progress of the reaction. To the obtained solution, 66 g of anhydrous hydrogen fluoride was introduced, while maintaining it at 10° C. The solution after the introduction changed from pale-yellow to colorless, and lithium hexafluorophosphate was formed.

Then, the excessive hydrogen fluoride in the obtained solution was converted to hydrogen chloride and lithium fluoride by adding lithium chloride again, and they were removed by vacuum treatment together with hydrogen chloride and phosphorus trifluoride, which were by-products during the reaction.

By NMR analysis of the obtained solution, diethyl carbonate decomposition or the like was not found, and the product was only lithium hexafluorophosphate. The amount of lithium hexafluorophosphate in the solution determined by NMR was 75 g, and yield was confirmed to be almost 100%. Furthermore, regarding this solution, the concentration of acid impurities having adverse effects on lithium battery characteristics was 14 ppm, and it was 98 ppm based on lithium hexafluorophosphate solid matter.

Example 3

A polytetrafluoroethylene reactor was charged with 500 g of methyl ethyl carbonate, 72 g of phosphorus trichloride, and 21 g of lithium chloride, followed by stirring and dispersion. Upon this, one subjected to shading treatment was used as the polytetrafluoroethylene reactor. While maintaining this disperse solution at 10° C., 35.5 g of chlorine gas was introduced. In the solution after the introduction, solid matter was dissolved, and it turned into a pale-yellow solution, and lithium hexachlorophosphate was formed by the progress of the reaction. To the obtained solution, 66 g of anhydrous hydrogen fluoride was introduced, while maintaining it at 10° C. The solution after the introduction changed from pale-yellow to colorless, and lithium hexafluorophosphate was formed.

Then, the excessive hydrogen fluoride in the obtained solution was converted to hydrogen chloride and lithium fluoride by adding lithium chloride again, and they were removed by vacuum treatment together with hydrogen chloride and phosphorus trifluoride, which were by-products during the reaction.

By NMR analysis of the obtained solution, methyl ethyl carbonate decomposition or the like was not found, and the product was only lithium hexafluorophosphate. The amount of lithium hexafluorophosphate in the solution determined by NMR was 75 g, and yield was confirmed to be almost 100%. Furthermore, regarding this solution, the concentration of acid impurities having adverse effects on lithium battery characteristics was 12 ppm, and it was 84 ppm based on lithium hexafluorophosphate solid matter.

Then, a test cell was prepared by using this solution, and the performance as an electrolyte solution was evaluated by a charge and discharge test. Firstly, the synthesized lithium hexafluorophosphate/methyl ethyl carbonate solution was concentrated about two times, and ethylene carbonate was added thereto such that methyl ethyl carbonate:ethylene carbonate=2:1 by volume ratio, thereby preparing a 1 mol/L lithium hexafluorophosphate/(a mixed solvent of methyl ethyl carbonate and ethylene carbonate) electrolyte solution.

Using this electrolyte solution, there was constructed a test cell using graphite as anode and lithium cobaltate as cathode. Specifically, 5 parts by weight of polyvinylidene fluoride (PVDF) as a binder was mixed with 95 parts by weight of a natural graphite powder. Furthermore, N,N-dimethylformamide was added to make a slurry. This slurry was applied on a nickel mesh, followed by drying at 150° C. for 12 hr, thereby making a test anode body. 10 parts by weight of a black smoke powder and 5 parts by weight of PVDF were mixed with 85 parts by weight of lithium cobaltate, and N,N-dimethylformamide was added to make a slurry. This slurry was applied on an aluminum foil, followed by drying at 150° C. for 12 hr, thereby making a test cathode body. A test cell was constructed by using a polypropylene nonwoven fabric as the separator, the reaction solution of the present example as the electrolyte solution, and the above anode body and cathode body. Then, a constant current, charge and discharge test was conducted. Both of charge and discharge were conducted at 0.35 mA/cm$^2$. A cycle of a charge until 4.2V and a discharge until 2.5V was repeated, and the change of capacity maintenance factor was observed.

As a result, the charge and discharge efficiency was almost 100%, and capacity maintenance factor after completing 100 cycles did not change at all.

Example 4

A polytetrafluoroethylene reactor was charged with 500 g of dimethyl carbonate, 69 g of phosphorus trichloride, and 21 g of lithium chloride, followed by stirring and dispersion. Upon this, one subjected to shading treatment was used as the polytetrafluoroethylene reactor. While maintaining this disperse solution at 25° C., 40 g of chlorine gas was introduced. In the solution after the introduction, solid matter was dissolved, and it turned into a pale-yellow solution, and lithium hexachlorophosphate was formed by the progress of the reaction. To the obtained solution, 66 g of anhydrous hydrogen fluoride was introduced, while maintaining it at 10° C. The solution after the introduction changed from pale-yellow to colorless, and lithium hexafluorophosphate was formed.

Then, the excessive hydrogen fluoride in the obtained solution was converted to hydrogen chloride and lithium fluoride by adding lithium chloride again, and they were removed by vacuum treatment together with hydrogen chloride and phosphorus trifluoride, which were by-products during the reaction.

By NMR analysis of the obtained solution, an impurity phase assumed to be decomposition of dimethyl carbonate was found in about 1%.

Example 5

A polytetrafluoroethylene reactor was charged with 500 g of dimethyl carbonate, 72 g of phosphorus trichloride, and 21 g of lithium chloride, followed by stirring and dispersion. Upon this, one subjected to shading treatment was used as the polytetrafluoroethylene reactor. While maintaining this disperse solution at 10° C., 35.5 g of chlorine gas was introduced. In the solution after the introduction, solid matter was dissolved, and it turned into a pale-yellow solution, and lithium hexachlorophosphate was formed by the progress of the reaction. To the obtained solution, 57 g of anhydrous hydrogen fluoride was introduced, while maintaining it at 10° C. The solution after the introduction changed from pale-yellow to colorless, and lithium hexafluorophosphate was formed.

Then, the excessive hydrogen fluoride in the obtained solution was converted to hydrogen chloride and lithium fluoride by adding lithium chloride again, and they were removed by vacuum treatment together with hydrogen chloride and phosphorus trifluoride, which were by-products during the reaction.

By NMR analysis of the obtained solution, dimethyl carbonate decomposition or the like was not found, and the product was mostly lithium hexafluorophosphate. An impurity phase assumed to be a partially fluorochlorinated lithium phosphate was also confirmed in about 1%. Furthermore, the residual chlorine was in about 300 ppm in the solution.

Comparative Example 1

A polytetrafluoroethylene reactor was charged with 500 g of anhydrous hydrogen fluoride, followed by dissolving 32 g of lithium fluoride. In another reactor, phosphorus pentachloride and anhydrous hydrogen fluoride were reacted to obtain phosphorus pentafluoride gas. This was blown in 155 g into the above lithium fluoride solution to cause a reaction. The obtained reaction solution was slowly cooled down to −20° C. by spending one night, thereby precipitating crystals of lithium hexafluorophosphate. The crystals were separated by filtration and subjected to vacuum treatment at room temperature to remove the attached hydrogen fluoride. By the above-mentioned operations, 65 g of lithium hexafluorophosphate crystals having a constant grain size of about 1 mm was obtained. The concentration of acidic impurities in the crystals was 300 ppm.

The invention claimed is:

1. A method for producing an electrolyte solution for lithium ion batteries, in which lithium hexafluorophosphate is used as an electrolyte, comprising the steps of:
    (a) reacting phosphorus trichloride, chlorine and lithium chloride in a nonaqueous organic solvent, thereby producing lithium hexachlorophosphate in the solvent; and
    (b) reacting the lithium hexachlorophosphate in the solvent with hydrogen fluoride, thereby producing a lithium hexafluorophosphate-containing solution.

2. A method for producing an electrolyte solution for lithium ion batteries according to claim 1, wherein the nonaqueous organic solvent is a chain or cyclic carbonate or an ether compound having at least two oxygen atoms.

3. A method for producing an electrolyte solution for lithium ion batteries according to claim 2, wherein the carbonate is at least one selected from the group consisting of dimethyl carbonate, diethyl carbonate, methyl ethyl carbonate, ethylene carbonate, and propylene carbonate.

4. A method for producing an electrolyte solution for lithium ion batteries according to claim 2, wherein the ether compound is 1,2-dimethoxyethane.

5. A method for producing an electrolyte solution for lithium ion batteries, in which lithium hexafluorophosphate is used as an electrolyte, comprising the steps of:
    (a) reacting phosphorus trichloride, chlorine and lithium chloride in a nonaqueous organic solvent, thereby producing lithium hexachlorophosphate in the solvent;
    (b) reacting the lithium hexachlorophosphate in the solvent with hydrogen fluoride, thereby producing a lithium hexafluorophosphate-containing solution; and
    (c) adding further lithium chloride to the solution produced in step (b) to convert excess hydrogen fluoride to hydrogen chloride and lithium fluoride.

6. A method for producing an electrolyte solution for lithium ion batteries according to claim 5, wherein the nonaqueous organic solvent is a chain or cyclic carbonate or an ether compound having at least two oxygen atoms.

7. A method for producing an electrolyte solution for lithium ion batteries according to claim 6, wherein the carbonate is at least one selected from the group consisting of dimethyl carbonate, diethyl carbonate, methyl ethyl carbonate, ethylene carbonate, and propylene carbonate.

8. A method for producing an electrolyte solution for lithium ion batteries according to claim 6, wherein the ether compound is 1,2-dimethoxyethane.

* * * * *